United States Patent Office 2,791,570
Patented May 7, 1957

2,791,570

WAX COATING COMPOSITION

Peter Stanley Backlund, Anaheim, Calif., assignor to Union Oil Company of California, Los Angeles, Calif., a corporation of California No Drawing. Application February 24, 1953,
Serial No. 338,572

8 Claims. (Cl. 260—28.5)

This invention relates to paraffin wax compositions and methods of making them and particularly to such compositions which are suitable for coating paper, paper cartons and similar materials. More particularly, the invention relates to wax compositions of relatively low melting point which are unusually susceptible to improvement in sealing strength characteristics by the incorporation of polyolefins.

Paraffin waxes have been used for coating paper cartons and for coating food wrapping paper, such as bread wrapping paper and the like, in order to produce cartons and paper which are impervious to air and moisture, thus permitting the use of such coated materials as containers and/or wrappers for food products. One of the advantages of using a coating, such as is obtainable by impregnating or coating the paper or cardboard material with paraffin wax, is that packages may be sealed without the use of glue or adhesive materials other than the coating materials themselves. It has been found, however, that papers coated with ordinary paraffin wax or even with paraffin wax containing various materials, as for example polyethylene, designed to improve the sealing strength of the paraffin wax, when sealed by the use of heat and pressure do not give a seal having sufficient strength for many purposes. Attempts have been made to improve the sealing strength of paraffin waxes by incorporating not only materials of the character of polyethylene, but also by incorporating small amounts of petrolatum or amorphous type waxes and although it has been found that the amorphous wax does improve the sealing strength in some instances, the improvement is not generally sufficient to produce a composition having desirably high sealing strength.

Generally the higher the melting point of the wax the greater will be the sealing strength, other things being equal and thus a relatively low melting point wax composition of high sealing strength, while being desirable has not been available. Coatings of relatively low melting point have the advantage that less heat is required to produce a satisfactory seal between layers of the coated paper.

Applicant has found that by the proper selection and preparation of the paraffin wax to be employed as a coating material it is possible to obtain a wax having a relatively low melting point and high sealing strength and that by adding small amounts of a polyolefin, as for example polyethylene, to the paraffin wax so produced it is possible to obtain a wax suitable for coating which has exceptionally high sealing strength characteristics. Thus, it is found that a blend of particular fractions of paraffin wax obtained in a certain manner from waxes normally recovered in the refining of petroleum, has a relatively low melting point and yet has unusually high sealing strength and more importantly this blended paraffin wax appears to be outstandingly more susceptible to improvement in sealing strength characteristics by the incorporation of small amounts of polyolefins than are ordinary paraffin waxes.

Thus, it is an object of this invention to prepare a paraffin wax having high sealing strength and other characteristics making it suitable for use in coating paper, paper cartons and the like.

It is another object of this invention to prepare a paraffin wax composition containing small amounts of polyolefins, which composition has exceptionally high sealing strength and possesses other characteristics making it suitable for coating paper and paper containers.

A more specific object of this invention is to produce a relatively low melting point paraffin wax which is unusually susceptible to improvement of sealing strength characteristics by the incorporation in said wax of small amounts of polyolefins.

A particular object of this invention is to prepare a coating composition having high sealing strength and being suitable for use in coating food wrapping paper and paper cartons, which composition contains a blend of at least two paraffin wax fractions and a small amount of polyethylene.

Other objects will be apparent as the description of the invention proceeds.

It is found that a particular heart-cut paraffin wax which is obtained by deoiling and distilling a slack wax has unusually high sealing strength and, when blended with small amounts, as for example 0.5% to 5% and preferably about 3% of a polyolefin, e. g., polyethylene, results in a product having outstandingly high sealing strength. This is the subject of my co-pending application Serial No. 338,571, filed of even date. Waxes and wax compositions prepared in the manner described therein have melting points between about 150° F. and about 170° F. and although such compositions have particular utility for most purposes it is desirable for many purposes to produce coating waxes and wax compositions having melting points below about 150° F. and still having the exceptionally high sealing strength of the higher melting point coating compositions described.

It has now been found that waxes melting as low as about 140° F. and having high sealing strength, i. e., sealing strengths equal to or greater than the strength of the coated paper itself can be prepared by first distilling a slack wax to produce at least two overhead fractions, one of which is a heart-cut which includes the overhead up to at least 70% and preferably up to 80% of the slack wax, deoiling the fractions so obtained and blending the deoiled fractions. The two fractions must be separately deoiled, preferably at different deoiling temperatures, and the deoiled fractions may then be recombined in various proportions to produce wax blends of varying melting points. Upon adding 0.5% to 5% and preferably about 3% of a polyolefin, such as polyethylene of 12,000–13,000 molecular weight, to the indicated blends, the resulting compositions are found to have very high sealing strengths. In most cases the blends have sealing strengths as high as the strength of the paper itself.

The heart-cut fraction referred to above may include the 40% to the 95% overhead fraction obtained by distilling slack wax, such as that obtained by dewaxing a topped, waxy crude oil as will be described hereinafter. Preferably this fraction will comprise the 50% to 90% fraction although fractions as narrow as the 50% to 80% or even 55% or 60% to 70% are found to be operable in preparing the wax blends of this invention. This fraction, following deoiling will have a melting point between about 150° F. and 170° F., an oil content of less than 1% and preferably less than about 0.5% and a sealing strength of at least about 20. On adding 3% of polyethylene of about 12,000–13,000 molecular weight, this wax will have a sealing strength of approximately 90 which is a strength approximately equal to the tearing strength of paper normally employed as bread wrapping paper. Thus, when paper is coated with a wax composition of this type, the sealing strength is as great as the strength of the paper itself.

The second fraction of wax to be employed will be a fraction falling within the first 60% and preferably within the first 50% overhead from the distillation of a slack wax. A preferred fraction is one which includes the 25% to 50% overhead fraction although the 0% to 50% fraction or narrower fractions within this range are operable. The percentage of the lower boiling fraction which may be employed, following deoiling, in preparing the final blend will depend upon the particular fraction employed as will be seen from the data presented herein. The second fraction, which will be referred to herein as the lower boiling fraction, after deoiling will have a melting point between about 125° F. and 150° F. and preferably within about 130° F. and 145° F. and will have an oil content less than 1% and preferably less than about 0.5%. Such fractions have sealing strengths between about 5 and about 12 and on adding 3% of polyethylene of 12,000–13,000 molecular weight the sealing strength is generally in the range of 5 to 15 or 20. Thus, sealing strength is either not improved or improved only to a minor extent on adding olefin polymer.

The term "sealing strength" as used in this description is that weight in grams per linear inch of seal required to separate, at a standard pulling rate, two pieces of coated paper which have been heat-sealed under standard conditions. This value is determined in a machine having a calibrated spring, the elongation of which is observed during the period of test, which spring is attached to one sheet of paper forming the seal and a means for pulling the second sheet of paper forming the seal at a constant rate so to give a stripping rate of approximately 3.0 mm. per second. The force required to separate the seal at the rate indicated is reported in grams per linear inch of seal. The test sample is prepared by coating two sheets of standard bread wrapping paper by dipping the paper in a bath containing the wax or wax composition to be used for coating and passing the coated paper over heated rolls to remove excess wax. The coated paper is permitted to cool to room temperature and is then sealed under standard conditions. Two pieces of the coated paper are heat-sealed at a temperature of 250° F. by pulling them over a hot plate maintained at this temperature under a load approximately 500 grams per linear inch of seal at a rate of about 0.65 meter per minute. Following this treatment the sealed paper is cut into strips 1 inch or 2 inches wide and these strips are then evaluated in the sealing strength test. Where the sealing strength is high it is preferable to employ strips 1 inch wide, however, where the sealing strength is relatively low, i. e., of the order of 20 grams or less, 2 inch strips give more reproducible results in the sealing strength test.

The paraffin waxes of this invention may be obtained from substantially any waxy crude oil by appropriate treatment. Thus, waxes having the characteristics of those described herein are obtained from waxy California crudes, Mid-Continent crudes and Pennsylvania crude oils. The method of separating the desirable fractions are substantially the same in each instance and the following description of the preparation of a desirable slack wax from a waxy California crude will serve to illustrate one method which is applicable with minor modifications, to any waxy crude oil. In the following process it is to be pointed out that it is not essential that the topped crude oil be solvent treated prior to dewaxing. Moreover, where desirable the topped crude may simply be deasphalted by methods well known in the art.

A typical California waxy crude oil is topped to remove fractions up to and including gas oil, leaving the fractions normally referred to as lubricating oil fractions as a residue. The resulting topped oil is extracted with a selective solvent designed to remove as extract the more aromatic portion of the oil. The raffinate from the solvent extraction operation is then dewaxed by any of the well known commercial dewaxing methods. Particularly satisfactory results are obtained by dewaxing using propane as the dewaxing solvent. The wax thus obtained, which is known as slack wax, contains 20% to 35% of oil depending upon the source and the particular method employed in the dewaxing operation. It is this slack wax which is distilled, preferably under vacuum, as for example at a pressure of 1.0 mm. to recover two distillate fractions, one of which is a heart-cut consisting of the 50% to 90% fraction of the original charge and the other a fraction within the 0% to 50% fraction, as for example the 25% to 50% fraction. The lower boiling fraction and the heart-cut fraction are then separately deoiled using standard deoiling methods. Deoiling temperatures between about 30–35% F. and 70° F. and preferably between 40° F. and 60° F. will be used in deoiling the lower boiling fraction of slack wax distillate and temperatures between about 50 F. and 85° F. and preferably between 60° F. and 75° F. will be used in deoiling the higher boiling fraction referred to herein as the heart-cut fraction containing material up to and including at least the 70% overhead. Particularly satisfactory results are obtained using methyl ethyl ketone or methyl isobutyl ketone as the deoiling solvent. It is desirable to operate under conditions such that the deoiled waxes have oil contents less than about 0.5% by weight although 1% oil is not too objectionable.

In preparing the heart-cut of the slack wax, although it has been indicated that the cut may include the 40% to 95% fraction, a 50% to 90% fraction is preferred in that it is the broadest fraction which gives the highest sealing strength. However, 40% to 70% fractions appear to be satisfactory and when blended with a separately deoiled lower boiling fraction and polyolefin give compositions of high sealing strength, i. e., values approaching 90. Where the upper end of the higher boiling heart-cut fraction is below about 70%, the advantages of high sealing strength are not obtainable. Thus, a heart-cut consisting of the 40% to 65% fraction of slack wax, after deoiling had a sealing strength of 8 and on blending with 3% polyethylene had a sealing strength of only about 15. Furthermore, when the 40% to 65% fraction was deoiled and blended with varying proportions of deoiled lower boiling fractions and with polyethylene the sealing strengths of the final blends were between about 10 and 15.

As has been indicated hereinabove, the sealing strength of the deoiled higher boiling heart-cut wax fraction is between about 20 and about 30 as compared with values of 5 to 15 or most paraffin wax fractions or blends of paraffin wax fractions with amorphous waxes. Moreover, this deoiled heart-cut wax fraction containing 3% polyethylene of 12,000–13,000 molecular weight, for example, will have a sealing strength of 90, as compared with sealing strengths of 15 to 20 for most commercial paraffin waxes containing 3% of the polyethylene or blends of such waxes with amorphous waxes which contain also 3% of polyethylene.

In selecting a lower boiling fraction to be deoiled and blended with the higher boiling heart-cut fraction, it is essential that it does not contain material up to the 70% overhead. Thus, it is found that a deoiled fraction of paraffin wax consisting of the 25% to 70% fraction of slack wax when blended with a higher boiling heart-cut fraction as described hereinabove gives a wax mixture which is not greatly improved in sealing strength by the addition of polyethylene.

The importance of fractionally distilling the slack wax to obtain the higher and lower boiling fractions and then separately deoiling these fractions is illustrated by the following data. A slack wax obtained from a topped, selective solvent-treated California waxy crude oil, which slack wax contained approximately 25% by weight of oil, was fractionally distilled to obtain a 25% to 90% fraction, the first 25% overhead and the bottoms being discarded. This selected fraction was deoiled to give a wax having a melting point of 153° F. and containing 0.3% oil and the deoiled wax was found to have a sealing strength of 6. After incorporating 3% by weight of polyethylene of 12,000–13,000 molecular weight in this wax, the resulting composition had a sealing strength of only 20.

A second composition was prepared following the teaching of this invention by fractionally distilling another portion of the same slack wax used in the preceding experiment. In this case the first 25% overhead was discarded and the 25% to 50% fraction and the 50% to 90% fraction were separately collected leaving approximately 10% of bottoms. The 25% to 50% fraction was deoiled at 45° F. using methyl ethyl ketone to produce a wax melting at 143° F. and containing 0.2% of oil. The 50% to 90% fraction was deoiled at 60° F. using methyl ethyl ketone to give a wax melting at 156° F. and containing 0.4% of oil. The two deoiled waxes were blended and the mixture, having a melting point of 149° F., was found to have a sealing strength of 9, however, on adding 3% by weight of polyethylene, the sealing strength was increased to 90.

The method of incorporating polyethylene or other polyolefin into the paraffin wax of this invention appears to have some effect on the sealing strength of the compositions produced. Thus, unless the polyolefin is well dispersed its effectiveness is not as great as when complete dispersal is obtained. A method which has been found entirely satisfactory consists in heating polyethylene, for example, to a temperature in the range of 315–350° F. until it softens and then adding small increments of paraffin wax and mixing them into the softened polymer. This incremental addition and mixing is continued until about 5 parts of wax to one part of polymer have been incorporated. The resulting mass, when cooled to temperatures of about 170° F., appears to precipitate the polymer so that it is preferable to maintain the polymer concentrate at a temperature at least as high as 200° F. until it is added to and mixed with the total amount of paraffin wax with which it is to be incorporated. The resulting wax product, which may contain from approximately 0.5% to about 5% by weight of the polymer, when cooled to room temperature, generally shows slight cloudiness, however, separation of polymer in the wax does not appear to be very great.

Polyolefins to be employed include the polyethylenes, polypropylenes and polybutylenes of approximately 8,000 to approximately 20,000 molecular weight. These polymers have the effect of greatly increasing sealing strength of the heart-cut paraffin waxes of this invention. The polyethylenes are the preferred polyolefins and polyethylene of 12,000–13,000 molecular weight is particularly preferred.

The following examples will serve to illustrate the invention.

*Example I*

A paraffin wax suitable for use in preparing compositions of this invention was prepared from a waxy California crude oil in the following manner. A waxy California crude having an A. P. I. gravity of 33.0 was distilled at a pressure of approximately 1.0 mm. to a temperature of 225° F. in order to remove all fractions up to and including gas oil. The residual crude oil was then solvent treated using a conventional method of solvent treatment with a commercial extractive solvent. The raffinate from this extraction had an A. P. I. gravity of 30.5 and a Saybolt Universal viscosity at 210° F. of 61.

The raffinate was dewaxed using propane as the solvent at a temperature of −40° F. the slack wax thus obtained, amounting to approximately 35.0% by weight of the residual lubricating oil fraction, had a melting point of 145° F. and contained approximately 25% by weight of oil.

This slack wax was distilled and separated into three overhead cuts leaving one residual fraction. The first overhead cut consisted of the 0.0 to 25% fraction, the second the 25 to 50% and the third the 50 to 90% fraction, leaving approximately 10% by weight of the original slack wax as bottoms.

Each of the overhead fractions and the bottoms fraction were deoiled at 60° F. using methyl isobutyl ketone as the deoiling solvent and following conventional deoiling procedures. The deoiled fractions had the following characteristics:

| Fraction, Percent by Weight | Melting Point, °F. | Oil Content, Percent by Weight |
|---|---|---|
| 0–25 | 130 | 0.09 |
| 25–50 | 143 | 0.04 |
| 50–90 | 158 | 0.10 |
| Bottoms | 174 | 0.50 |

*Example II*

Coating compositions of this invention were prepared from the various deoiled fractions produced in Example I by blending portions of the 50–90% fraction with different proportions of each of the lower boiling fractions. In all cases 3% of polyethylene of 12,000–13,000 molecular weight was incorporated in the wax blend and in some cases blends were prepared containing 1% and 5% of the polyethylene. The polyethylene was incorporated in the wax in the manner described hereinabove. Bread wrapping paper was then coated with each of the coating compositions prepared, and, for comparison, with some of the wax blends without added polyethylene. Strips of the paper were passed through a bath containing the coating composition maintained at a temperature of 250° F. and following removal from the bath the coated paper was passed over steam heated rollers to remove excess wax from the paper. After cooling to room temperature strips of the coated paper were sealed by passing the paper over a hot plate maintained at approximately 250° F.; the sealing being effected by applying a weight to a roller resting on the paper strips as they passed over the hot plate, the weight applied being approximately 500 grams per linear inch of seal. The paper sealed with straight wax was then cut into 2 inch strips and the paper sealed with wax containing polyethylene into 1 inch strips 6 inches long for testing. In each instance three samples were tested and the results reported in the following tables are averages of the results obtained in the three tests.

| Coating No. | M. P., °F. | Wax Fractions, Percent by Wt. | | | Polyethylene, Percent by Wt. of Wax | Sealing Strength, g./Lin. In. |
|---|---|---|---|---|---|---|
| | | 0–25% | 25–50% | 50–90% | | |
| 1 | 149 | | 50 | 50 | | 5 |
| 2 | 149 | | 50 | 50 | 3 | 90 |
| 3 | 149 | | 50 | 50 | 1 | 90 |
| 4 | 149 | | 50 | 50 | 5 | 90 |
| 5 | 145.5 | | 80 | 20 | | 7.5 |
| 6 | 145.5 | | 80 | 20 | 3 | 90 |
| 7 | 155.0 | | 20 | 80 | 3 | 90 |
| 8 | 156.0 | 10 | | 90 | 3 | 90 |
| 9 | 154.0 | 20 | | 80 | 3 | 90 |
| 10 | 147 | 10 | 50 | 40 | | 5 |
| 11 | 147 | 10 | 50 | 40 | 3 | 90 |
| 12 | 147 | 10 | 50 | 40 | 5 | 90 |
| 13 | 147 | 10 | 50 | 40 | 1 | 80 |

*Example III*

Example I was repeated except that the overhead fractions were deoiled at different temperatures using methyl ethyl ketone as the deoiling solvent. The following table shows the temperatures of deoiling together with the melting points and oil contents of the fractions.

| Fraction, percent by Weight | Deoiling Temp., °F. | Melting Point, °F. | Oil Content, percent by Weight |
|---|---|---|---|
| 0–25 | 55 | 129.0 | 0.05 |
| 25–50 | 60 | 143 | 0.08 |
| 50–90 | 65 | 158.5 | 0.20 |

A blend prepared by mixing equal parts of the deoiled 50–90% fraction and the deoiled 25–50% fraction and then incorporating 3% by weight of a polyethylene of 12,000–13,000 molecular weight based on the wax had a melting point of 148° F. and a sealing strength of 90.

A second blend of 20 parts of the deoiled 0–25% fraction and 80 parts of the deoiled 50–90% fraction containing 3% of polyethylene based on the wax had a sealing strength of 90.

*Example IV*

A coating composition prepared in the same manner as coating No. 2 of Example II, except that a polybutylene of about 8,000 molecular weight was substituted for the polyethylene, had a sealing strength of 90.

*Example V*

A slack wax obtained from a topped Pennsylvania crude oil was fractionally distilled and the 15–50% fraction and the 50–90% fraction separately recovered. The 15–50% fraction was deoiled at 45° F. to give a wax melting at 132° F. The 50–90% fraction was deoiled at 70° F. to give a wax melting at 143° F.

A sealing compound was prepared which consisted of 75 parts by weight of the deoiled 15–50% and 25 parts by weight of the deoiled 50–90% fraction containing 3% by weight of polyethylene of 12,000–13,000 molecular weight. This compound had a sealing strength of 90. The wax blend had a melting point of 136° F.

For purposes of comparison and to show the necessity of obtaining separate distillate fractions and separately deoiling the fractions, a second fractional distillation was carried out on a portion of the slack wax used in preparing the composition described hereabove. In this case a single heart-cut fraction containing the 15% to 90% overhead distillate was produced. This 15% to 90% fraction was deoiled at 60° F. and the deoiled wax blended with 3% by weight of polyethylene of 12,000–13,000 molecular weight. This product had a sealing strength of only 25.

*Example VI*

A slack wax produced as described in Example I was fractionally distilled to produce three overhead fractions and leave about 20% bottoms. The fractions were separately deoiled. Deoiling temperatures and tests on the deoiled fractions were:

| Fraction, percent by Weight | Deoiling Temp., °F. | Melting Point, °F. | Oil Content, percent by Weight |
|---|---|---|---|
| 0–20 | 60 | 127 | 0.03 |
| 20–40 | 60 | 137 | 0.09 |
| 40–80 | 60 | 155 | 0.15 |

A coating composition consisting of 30 parts of the deoiled 20–40% fraction and 70 parts of the deoiled 40–80% fraction, together with 3% based on the wax of polyethylene, had a melting point of 149.6° F. and a sealing strength of 90.

It will be seen from the foregoing examples that the proportion of lower boiling fraction may be as high as 80% without lowering the sealing strength of blends containing polyolefins below about 90 and as much as 90% may be used without seriously reducing the sealing strength. In general it has been found that in order to obtain the desired melting point lowering of the higher boiling fraction it is necessary to use at least 10% to 20% of the lower boiling fraction. Thus, the ratio of lower boiling fraction to higher boiling fraction may range from 0.1 to as high as about 9 to 1. Preferably the ratio will be from about 0.25 to about 4 to 1.

It is to be noted that the melting points of the wax blends are not appreciably changed by the addition of the relatively small amounts of polyolefins defined herein. Thus, the melting point of the coating compositions is substantially the same in most cases as the melting points shown for the wax mixtures.

The foregoing description of my invention is not to be taken as limiting my invention but only as illustrative thereof since many variations may be made by those skilled in the art without departing from the scope of the following claims.

I claim:

1. A composition having high sealing strength and being suitable for use in coating food wrapping paper and paper containers, said composition comprising at least two different distillate fractions of slack wax, a lower boiling fraction and a higher boiling fraction, which fractions have been separately deoiled, and between about 0.5% and 5% based on the wax of a polyolefin having a molecular weight between about 8,000 and about 20,000, said lower boiling fraction consisting of material within the first 50% overhead and said higher boiling fraction consisting of material within the 50% to 95% overhead obtained in the fractional distillation of slack wax.

2. A composition having high sealing strength and being suitable for use in coating food wrapping paper and paper containers, said composition comprising at least two different distillate fractions of slack wax, a lower boiling fraction and a higher boiling fraction, which fractions have been separately deoiled, and between about 0.5% and 5% based on the wax of a polyolefin having a molecular weight between about 8,000 and about 20,000, said lower boiling fraction consisting of the first 50% overhead and said higher boiling fraction consisting of the 50% to 90% heart-cut obtained in the fractional distillation of slack wax.

3. A composition according to claim 2 in which said polyolefin is a polyethylene.

4. A composition according to claim 2 in which said polyolefin is polyethylene of about 12,000–13,000 molecular weight and said composition contains about 3% of said polyethylene.

5. A composition having high sealing strength and being suitable for use in coating food wrapping paper and paper containers, said composition comprising paraffin wax and between about 0.5% and about 5% by weight based on the paraffin wax of a polyolefin having an average molecular weight between 8,000 and 20,000, said paraffin wax comprising a blend of at least two different fractions of paraffin wax, obtained by dewaxing a topped, waxy crude oil to obtain a slack wax, fractionally distilling the slack wax and separately recovering a lower boiling fraction within the first 60% overhead and a higher boiling fraction within the 40% to 95% overhead, said higher boiling fraction containing overhead up to at least the 70% overhead, separately deoiling the lower boiling and the higher boiling fractions and recombining the deoiled fractions.

6. A composition having high sealing strength and being suitable for use in coating food wrapping paper and paper containers, said composition comprising paraffin wax and between about 0.5% and about 5% by weight based on the paraffin wax of a polyolefin having an average molecular weight between 8,000 and 20,000, said paraffin wax comprising a blend of at least two different fractions of paraffin wax, obtained by dewaxing a topped, waxy crude oil to obtain slack wax, fractionally distilling the slack wax and separately recovering a lower boiling fraction within the first 50% overhead and a higher boiling fraction within the 50% to 90% overhead, said higher boiling fraction containing overhead up to at least the 70% overhead, separately deoiling the fractions to produce waxes containing less than about 1% by weight of oil and recombining the deoiled fractions in a ratio of between 0.1 and 9 parts of lower boiling fraction per part of higher boiling fraction.

7. A composition according to claim 6 in which the lower boiling fraction is the 25% to 50% fraction and the higher boiling fraction is the 50% to 90% fraction.

8. A composition according to claim 6 in which the polyolefin is polyethylene of 12,000–13,000 molecular weight and the deoiled fractions are recombined in the ratio of between 0.25 and 4 parts of lower boiling fraction per part of higher boiling fraction.

References Cited in the file of this patent

FOREIGN PATENTS

| | | |
|---|---|---|
| 642,441 | Great Britain | Sept. 6, 1950 |
| 642,442 | Great Britain | Sept. 6, 1950 |